United States Patent [19]
Cohen

[11] Patent Number: 5,481,650
[45] Date of Patent: Jan. 2, 1996

[54] BIASED LEARNING SYSTEM

[75] Inventor: William W. Cohen, North Plainfield, N.J.

[73] Assignee: AT&T Corp., Murray Hill, N.J.

[21] Appl. No.: 320,102

[22] Filed: Oct. 7, 1994

Related U.S. Application Data

[63] Continuation of Ser. No. 906,641, Jun. 30, 1992, abandoned.
[51] Int. Cl.⁶ ................................................... G06F 15/18
[52] U.S. Cl. .................................................. 395/77
[58] Field of Search ............................ 395/10, 12, 50, 395/51, 60, 61, 67, 77

[56] References Cited

U.S. PATENT DOCUMENTS

| | | | |
|---|---|---|---|
| 4,730,259 | 3/1988 | Gallant | 395/60 |
| 4,775,935 | 10/1988 | Yourick | 395/155 |
| 4,970,657 | 11/1990 | Wolf | 395/54 |
| 5,083,268 | 1/1992 | Hemphill et al. | 395/12 |
| 5,138,694 | 8/1992 | Hamilton | 395/10 |
| 5,187,773 | 2/1993 | Hamilton et al. | 395/10 |
| 5,222,197 | 6/1993 | Teng et al. | 395/77 |

OTHER PUBLICATIONS

Quinlan, "Learning Logical Definitions from Relations", Machine Learning, vol. 5 No. 3, 1990.
Pazzini et al, "A Knowledge–Intensive Approach to Learning Relational Concepts", Proc of 8th Int'l Workshop on Machine Learning, 1991.
Quinlan, "Knowledge Acquisition from Structured Data", IEEE Expert vol. 6 Iss 6 pp. 32–37 Dec. 1991.
Angluin et al, "Learning Conjunction of Horn Clauses", Proc 31st Annual Symposium on Foundations of Computer Science, Oct. 22–24, 1990, pp. 186–192 vol. 1.
Mahdy et al, "Learning Design Rules and Concepts from Examples–A Case Study to Design an Electric Power Substation", Conf Record of the 1991 IEEE Industry Applications Society Annual Meeting, Sep. 28–Oct. 4, 1991, pp. 1206–1215 vol. 2.
Li, "A Logic Theory of Learning from Experience", 3rd Int'l Conf on Tools for AI, Nov. 10–13, 1991, pp. 540–541.

*Primary Examiner*—Robert W. Downs
*Attorney, Agent, or Firm*—Geoffrey D. Green

[57] ABSTRACT

The invention permits various types of background knowledge for a concept learning system to be represented in a single formal structure known as an antecedent description grammar. A user formulates background knowledge for a learning problem into such a grammar, which then becomes an input to a learning system, together with training data representing the concept to be learned. The learning system, constrained by the grammar, then uses the training data to generate a hypothesis for the concept to be learned. Such hypothesis is in the form of a set of logic clauses known as Horn clauses.

4 Claims, 3 Drawing Sheets

FIG. 1 goal_formula(illegal(A,B,C,D,E,F)). —101 body(illegal(A,B,C,D,E,F))→rels(A,B,C,D,E,F). —102 rels(A,B,C,D,E,F)→[ ]. —103
rels(A,B,C,D,E,F)→rel(A,B,C,D,E,F),rels(A,B,C,D,E,F). —104 rel(A,B,C,D,E,F)→pred (X,Y).
    where member(X,[A,B,C,D,E,F]),member(Y,[A,B,C,D,E,F]). —105 pred(X,Y)→[X=Y]. —106
pred(X,Y)→[¬ X=Y]. —107
pred(X,Y)→[adj (X,Y)]. —108
pred(X,Y)→[¬ adj (X,Y)]. —109
pred(X,Y)→[less_than (X,Y)]. —110
pred(X,Y)→[¬ less_than (X,Y)]. —111

FIG. 2 body(illegal(A,B,C,D,E,F)) :-rels(A,B,C,D,E,F). —202 rels(A,B,C,D,E,F) :-true. —203
rels(A,B,C,D,E,F) :-rel(A,B,C,D,E,F)∧rels(A,B,C,D,E,F). —204 rel(A,B,C,D,E,F) :-pred(A,A).
rel(A,B,C,D,E,F) :-pred(A,B).
    ⋮
rel(A,B,C,D,E,F) :-pred(F,F).  } 205 pred(X,Y) :-X=Y. —206
pred(X,Y) :-¬X=Y. —207
pred(X,Y) :-adj(X,Y). —208
pred(X,Y) :-¬adj(X,Y). —209
pred(X,Y) :-less_than(X,Y). —210
pred(X,Y) :- ¬ less_than(X,Y). —211

FIG. 4 goal_formula(illegal(A,B,C,D,E,F)).

401 {
    body(illegal(A,B,C,D,E,F)).→
        rels(A,C),rels(A,E),rels(C,E). ← 402
        rels(B,D),rels(B,F),rels(D,F). ← 403 rels(X,Y)→ordering(X,Y),adjacency(X,Y). ← 404

405 {
    ordering(X,Y)→[less_than(X,Y)].
    ordering(X,Y)→[less_than(Y,X)].
    ordering(X,Y)→[¬less_than(X,Y)].
    ordering(X,Y)→[¬less_than(Y,X)].
    ordering(X,Y)→[X=Y].
    ordering(X,Y)→[¬X=Y].

406 {
    adjacency(X,Y)→[adj(X,Y)].
    adjacency(X,Y)→[¬adj(X,Y)].

FIG. 5 goal_formula (variety (Iris)).
variety (Iris)→cliches (Iris).
cliches(Iris)→[ ].
cliches (Iris)→cliche (Iris), cliches (Iris).
cliche (Iris)→[sepal_length (Iris, X), X<Th] where member (Th, [20,....,44]). ← 501
cliche (Iris)→[sepal_length (Iris, X), X>Th] where member (Th, [20,....,44]).
cliche (Iris)→[sepal_width (Iris, X), X<Th] where member (Th, [43,....,79]).
cliche (Iris)→[sepal_width (Iris, X), X>Th] where member (Th, [43,....,79]).
cliche (Iris)→[petal_length (Iris, X), X<Th] where member (Th, [1,....,25]).
cliche (Iris)→[petal_length (Iris, X), X>Th] where member (Th, [1,....,25]).
cliche (Iris)→[petal_width (Iris, X), X<Th] where member (Th, [11,....,67]).
cliche (Iris)→[petal_width (Iris, X), X>Th] where member (Th, [11,....,67]).

BIASED LEARNING SYSTEM

This application is a continuation application Ser. No. 07/906,641, filed on Jun. 30, 1992, now abandoned.

FIELD OF THE INVENTION

This invention relates to learning systems and, more particularly, to learning systems that learn by formulating sets of rules from input data and desired responses to such data.

BACKGROUND OF THE INVENTION

Several classes of learning systems are known in the art. One broad class makes use of neural networks, either in the form of actual networks of electronic circuits or computer simulations of such networks. Learning in neural networks takes place by applying input signals to the network and adjusting connecting weights among neurons so that output signals from the network reflect the desired response to the input signals. Another broad class makes use of decision trees induced from training examples and the desired responses. Such decision trees can be reduced to sets of rules that can be applied to actual data.

Learning systems are becoming widely used as expert systems that acquire knowledge in a specific field or about a specific kind of problem. The input to expert systems can come from examples of input data and known responses to such data or from the knowledge of human experts. While learning systems can learn from examples alone, such systems can be made more efficient and accurate if background knowledge can be conveniently expressed as an input.

The results obtained by a learning system, whether in the form of weights for a neural network, rules from a decision tree or some other form, can be said to be a hypothesis or theory of the concept to be learned. The "target theory" for a learning system is the ideal theory that would always generate the correct output for a given set of input data. In practice, given data from the real world, it may never be possible to generate a target theory that always gives a "correct" result. However, in testing a learning system, it is often useful to determine how close the system can come to generating a known target theory from a set of training examples that correspond to the theory.

Some learning systems generate output in the form of a set of rules or "clauses," rather than a neural network or a decision tree. Such a set of clauses forms a logical theory; if learning is successful, then this theory is close to or similar to the target theory. An example of a prior-art learning system that generates logic clauses is FOIL, described in J. R. Quinlan "Learning Logical Definitions from Relations," Machine Learning, Vol. 5, No. 3, 1990.

A variety of techniques are known for taking advantage of special types of background knowledge, including constraints on how predicates can be used, programming cliches, overgeneral theories, incomplete theories and theories syntactically close to the target theory.

A way of extending FOIL to obey constraints on how predicates can be used is described in M. Pazzani and D. Kibler "The Utility of Knowledge in Inductive Learning," Technical Report 90-18, University of California/Irvine, 1990. An extension to FOIL that takes advantage of programming constructs or "cliches" useful in learning systems is described in G. Silverstein and M. Pazzani "Relational Cliches: Constraining Constructive Induction During Relational Learning," Proceedings of the Eighth International Workshop of Machine Learning, Ithaca, New York, 1991, Morgan Kaufmann. In some circumstances it is helpful to have a theory defining a concept that is related in some specific way to the target theory. A technique that uses overgeneral theories related to the target theory is IOE described in N. Flann and T. Dietterich "A Study of Explanation-Based Methods for Inductive Learning," Machine Learning, Vol. 4, No. 2, 1989. A way of incorporating incomplete theories is described in B. Whitehall and S. Lu "A Study of How Domain Knowledge Improves Knowledge-Based Learning Systems," Proceedings of the Eighth International Workshop of Machine Learning, Ithaca, New York, 1991, Morgan Kaufmann. Examples of incorporating syntactically close theories are shown in the Pazzani and Kibler article referred to above.

It is known how to integrate several different techniques for using background knowledge into the same learning system. An example is FOCL, described in M. Pazzani, G. Brunk and G. Silverstein "A Knowledge-Intensive Approach to Learning Relational Concepts," Proceedings of the Eighth International Workshop of Machine Learning, Ithaca, New York, 1991, Morgan Kaufmann. The problem, however, is to find a single technique for incorporating all these types of background knowledge, as well as other types of information about the target concept, into a learning system.

SUMMARY OF THE INVENTION

The invention permits various types of background knowledge for a concept learning system to be represented in a single formal structure known as an antecedent description grammar. A user formulates background knowledge about a learning problem into such a grammar, which then becomes an input to a learning system, together with training data representing the concept to be learned. The learning system, constrained by the grammar, then uses the training data to generate a hypothesis for such concept. Such hypothesis is in the form of a set of logic clauses known as Horn clauses. Each clause comprises an antecedent and a consequent.

The antecedent description grammar is a set of grammar rules that describe how a designated start symbol for the grammar, representing the target concept, can be rewritten to various sequences of conditions to form the antecedents for Horn clauses that may be used in the hypothesis generated by the learning system. The consequent for each clause is the designated start symbol.

The learning system generates a hypothesis by evaluating various Horn clauses with antecedents derived using the grammar from the start symbol. Each such clause is derived by applying a "nonlooping linear sequence" of grammar rules to the start symbol or to the antecedent of a previously evaluated clause. In a "nonlooping sequence," no grammar rule is used more than once; in a "linear sequence," each rule in the sequence rewrites a symbol introduced by the immediately preceding rule.

The training data contains both positive and negative examples. In one embodiment of the invention, the hypothesis generation proceeds by calculating the "information gain" with respect to such data for each of a first series of derived Horn clauses, choosing the clause with the highest information gain and, if the chosen clause covers negative examples, repeating such calculating and choosing steps for successive levels of Horn clauses until a clause results that does not cover negative examples, or that covers only an acceptably small number of negative examples. Such clause is added to the hypothesis and the positive examples covered by the clause are removed. The process is repeated until substantially all positive examples are eliminated. The clauses forming the hypothesis can then be used to evaluate whether examples in new data are positive or negative examples.

DESCRIPTION OF THE DRAWINGS

FIG. 1 shows an antecedent description grammar for a learning example used in explaining the invention.

FIG. 2 shows a Horn theory derived from the antecedent descriptive grammar of FIG. 1.

FIG. 4 shows an improved antecedent description grammar including additional constraints.

FIG. 5 shows an antecedent description grammar for a learning example involving thresholds.

DETAILED DESCRIPTION

Figure 3:
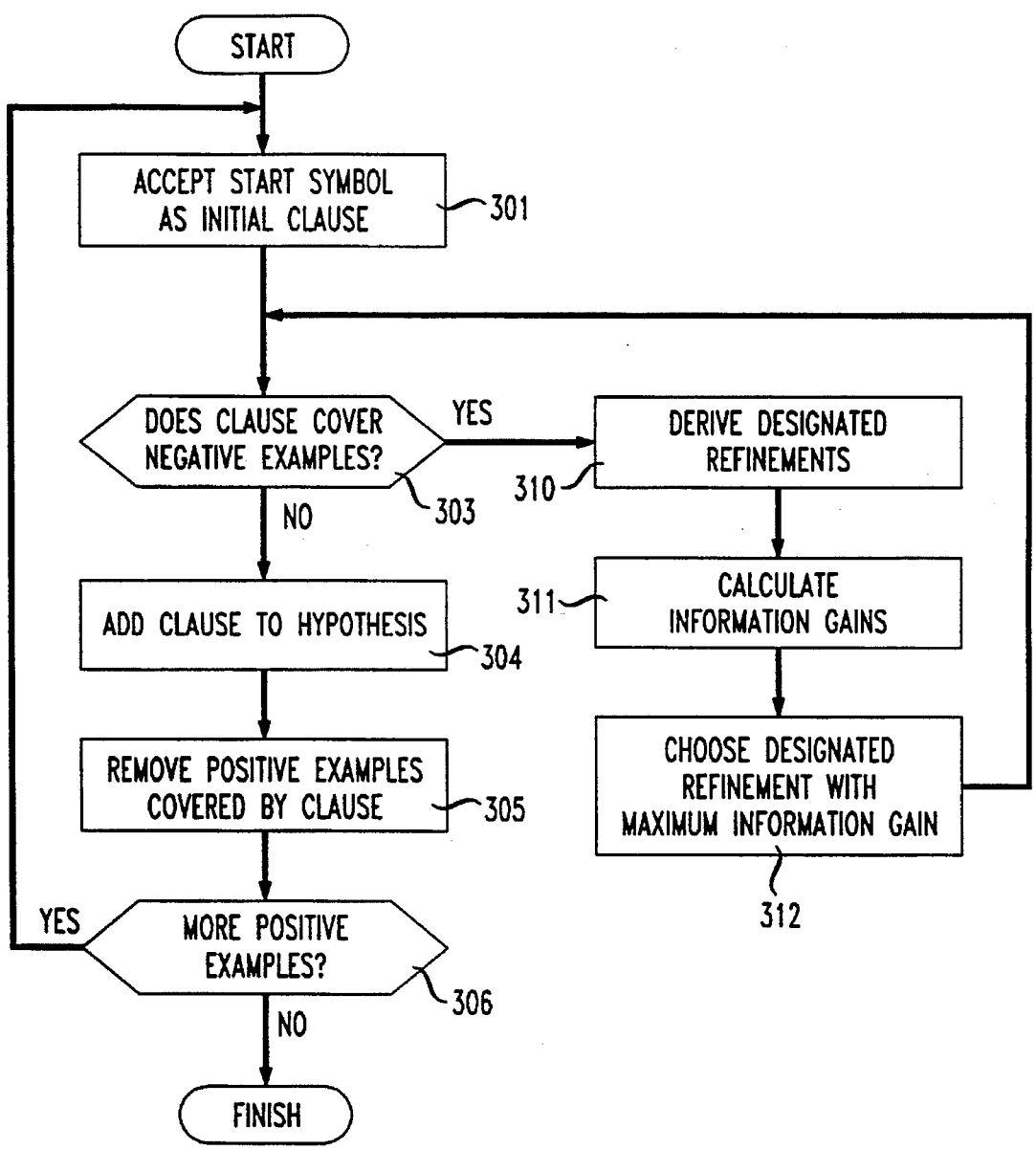
FIG. 3 is a block diagram showing how the clauses of a hypothesis are generated by the learning system of the invention.

A chess problem that has been used frequently as an example in the prior art (e.g. the Quinlan article referred to above) will be used as one example of a learning problem for the purpose of explaining the invention. The problem is that of learning when a chess position containing a white king, a white rook and a black king is illegal, assuming white to move. The target theory is known, in that some positions are impossible (e.g. two pieces cannot occupy the same square) and other positions are illegal under the rules of chess (e.g. if two kings are adjacent or if the black king is in check). Given a large enough number of examples of chess positions and indications of whether or not such positions are permitted, an effective learning system should be able to generate a hypothesis closely approximating such target theory.

In order to be able to construct an antecedent description grammar, a concept description language must be used. The language that will be use in this description of the invention is a subset of Prolog, which is a programming language based on Horn-clause theorem proving. Prolog is described in "The Art of Prolog: Advanced Programming Techniques" by Leon Sterling and Ehud Shapiro, MIT Press, 1986 and in "Programming in Prolog" by W. F. Clocksin and C. S. Mellish, Springer- Verlag, 1981. Prolog is well known to those skilled in the learning-system art; however, other concept description languages could be used without departing from the spirit and scope of the invention.

The learning problem can be stated as the problem of generating a hypothesis for the predicate illegal(A,B,C,D,E,F)

where A and B are the rank and file of the white king, C and D are the rank and file of the white rook and E and F are the rank and file of the black king. Since a chess board has eight ranks and eight files, each variable can have a value from 1 to 8. What is needed are practical ways (i) to limit the number of possible relationships among the variables that a learning system must consider and (ii) to efficiently generate a hypothesis for the concept to be learned.

An antecedent description grammar for use in accordance with the invention allows a user to define boundaries for a learning problem, that is, to define a "hypothesis space" within which the learning system operates. Such boundaries, in effect, incorporate background knowledge about the target concept to be learned without actually specifying the target concept itself. In fact, the concept itself may be unknown.

A grammar is a set of rules of the form $$A \rightarrow B_1, B_2, \ldots B_k.$$

Each rule specifies that the symbol "A" can be rewritten as the series of symbols "$B_1, B_2, \ldots B_k$," where symbol $B_1$ can be either another symbol of the grammar or a terminal symbol. In an antecedent description grammar, a terminal symbol is some condition allowed in the antecedent of a clause. All symbols are logical literals, which may contain logical variables such as the variables A–F in the chess problem predicate shown above. The hypothesis to be generated by the learning system of the invention will comprise a series of Horn clauses, each having a consequent and an antecedent. The rules of an antecedent description grammar specify permitted steps in the derivation of the Horn clauses. An antecedent description grammar for the chess problem is shown in FIG. 1 and will now be described.

Referring now to FIG. 1, line 101 declares the goal formula for the grammar, thereby defining the concept to be learned and declaring the variables involved. Lines 102–111 are the rules of the grammar.

Rule 102 states that the symbol body(illegal (A,B,C,D,E,F), which is called the starting symbol for the grammar, can be expanded to the symbol rels(A,B,C,D,E,F).

The latter symbol can be rewritten in the grammar to a sequence of any number of relationships among the variables A–F by using rules 103 and 104. Rule 104 allows such symbol to be rewritten as a single relationship, indicated by the symbol rel(A,B,C,D,E,F), followed by another sequence of relationships among the variables. Rule 103 allows such symbol to be rewritten to a sequence of zero relationships. Thus, by using rule 104 twice followed by rule 103, such symbol can be rewritten as a sequence of two relationships. Rule 105 states that relationships can exist between pairs of the variables A–F. Rules 106–111 express the relationships that can exist between pairs of variables in the form of various predicates. In the notation used, rule 108 means that variable X is adjacent to variable Y, that is, the value of X is either smaller or larger than Y by the integer 1; and rule 109 means that variable X is not adjacent to variable Y.

Terminal symbols, that is, symbols that cannot be expanded to some other form, are shown in square brackets, for example, as in rules 106–111. All other symbols are nonterminal.

Using the grammar, the starting symbol body(illegal(A,B,C,D,E,F), can be rewritten to a string of literals of arbitrary length, where each literal is any of the predicates adj, equal or less_than and with its arguments bound to any of the variables A–F. For example, adj(A,E),adj(B,F)

is such a suing. So far, the grammar defines a relatively weak learning bias in that almost any clause using the indicated set of terminal symbols can be generated; modifications to be described below will strengthen the bias.

A learning system in accordance with the invention takes as an input an antecedent description grammar as described above and a set of training examples and generates a hypothesis that is a set of Horn clauses of the form $p(X_1, \ldots X_n):-body_1$ $p(X_1, \ldots X_n):-body_2$

.
.
.

$p(X_1, \ldots X_n):-body_k$ where $p(X_1, \ldots X_n)$ is the consequent and $body_i$ is the antecedent. Each $body_i$ is a sentence of the grammar converted from a string of symbols to a logical conjunction. Such a learning system is biased, that is, given background knowledge about the target concept to be learned, by appropriately restricting the antecedent description language. The learning system of the invention generates hypotheses by proposing clauses in which each $body_i$ is a sentential form, rather than a sentence, of the antecedent description language. A string of symbols is called a sentential form if it contains nonterminal symbols and a sentence if it contains only terminal symbols. Thus, the hypothesis space to be searched for clauses to express a concept is bounded by such sentential forms.

In order to use sentential forms to define a hypothesis space, it is necessary to be able to efficiently test whether or not a training example is covered by any of the clauses that can be derived from the sentential form. This is done by translating each grammar rule into a Horn clause, then use a Horn theorem prover to determine whether the training example is covered. Such theorem provers are well known in the art, for example, a Prolog interpreter is a simple variety of Horn-clause theorem prover. The combination of the Horn clauses rewritten from sentential forms and clauses that define the feature predicates (rewritten from rules 106-110 in FIG. 1) results in what can be called a Horn theory.

The Horn theory for the grammar in FIG. 1 is shown in FIG. 2. In FIG. 2, each grammar rule from FIG. 1 has been rewritten as a Horn clause, for example, grammar rules 102, 103 and 104 have been rewritten as Horn clauses 202, 203 and 204. Grammar rule 105 has been expanded into a full series of 36 Horn clauses 205.

Testing a hypothesis is slowed by having to repeatedly prove vacuous predicates, that is, predicates that are always true. This problem can be addressed by simplifying clauses hypothesized by the learning system to remove vacuous predicates before using the theorem prover. Similarly, the final clauses of a hypothesis are simplified before being presented to the user. This simplification is accomplished by a static analysis of the Horn theory to determine which predicates of the theory are always true. Such predicates can then be discarded from any conjunctive clause in which they appear. The static analysis proceeds in two phases: in the first phase, predicates that are always true are identified; in the second phase, information about such predicates is propagated to other predicates in the theory in one or more iterations.

The actual method of generating the Horn clauses representing the concept to be learned can now be described. FIG. 3 is a block diagram showing the various steps in the method used by the learning system of the invention.

As indicated by block 301, the start symbol of the antecedent description grammar, Written in the form of a Horn clause, is used as the initial clause. Then, as indicated by block 303, the clause is tested against the examples of the training data to determine whether it covers negative examples. If it does, then the clause must be refined by rewriting its antecedent, such as by adding more predicates, in accordance with the antecedent description grammar, until a clause that does not cover negative examples results.

There are usually a number of possible refinements to a clause and a choice must be made among them. In accordance with the invention, such choice is made by calculating the "information gain" for each such clause with respect to the clause from which it is derived and choosing the clause with the highest information gain. There are a number of possible heuristics that can be used to determine information gain. One heuristic that has been used with the invention defines the information gain of clause $C_{i+1}$ with respect to clause $C_i$ as $$\text{Gain}(C_{i+1}, C_i) \equiv T_i^{++} \times \left( -\log_2 \frac{T_i^+}{T_i^+ + T_i^-} + \log_2 \frac{T_{i+1}^+}{T_{i+1}^+ + T_{i+1}^-} \right)$$

where $T_1^+$ and $T_1^-$ are the number of positive and negative examples respectively covered by clause $C_2$ and $Ti_1^{++}$ is the number of positive examples covered by $C_i$ that are also covered by $C_{i+1}$. A similar heuristic for information gain is used in the FOIL learning system, and is discussed in more detail in the Quinlan article referred to above.

It is desirable to limit the number of computations of information gain as much as possible by considering only a small number of possible refinements of each clause; however, it is also necessary that the number of possible refinements considered is large enough to contain clauses with differing information gains. The learning system of the invention thus uses information gain to choose only among those refinements that can be derived via a nonlooping linear sequence of rewrites. Such refinements are called "designated refinements." A "linear sequence" is a sequence of rewrites of a clause in which each grammar rule rewrites a symbol that was introduced by the immediately preceding rule. A "nonlooping sequence" is one in which no grammar rule is used more than once. These restrictions limit the number of designated refinements to a reasonable number. For example, the symbol rels(A,B,C,D,E,F) from the chess example described above can be rewritten as rel(A,B,C,D,E,F)rels(A,B,C,D,E,F)using grammar rule 104, then the newly-introduced symbol rel(A,B,C,D,E,F) can be rewritten as pred(A,B) using rule 105 and variables A and B resulting in the string pred(A,B)rels(A,B,C,D,E,F) and newly-introduced symbol pred(A,B) can be rewritten as A=B using rule 106.

If a clause covers negative examples, then, the next steps are to derive the designated refinements of the clause, calculate the information gain for each designated refinement and choose the designated refinement having the highest information gain, as indicated by block 310. The chosen designated refinement is then tested to determine whether it also covers negative examples. If so, then steps 310, 311 and 312 are repeated.

When a clause results that does not cover negative examples, that clause is added to the hypothesis being generated and the positive examples covered by the clause are removed from the training set, as indicated by blocks 304 and 305. If positive examples remain, then the above process is repeated, as indicated by block 306, until the clauses in the hypothesis account for all the positive examples. The results of the information gain calculations for the various designated refinements will differ on each pass through step 311 because of the removal of the positive examples for the prior clause added to the hypothesis.

The operation of the invention will now be described as it relates to the chess example. A sample set of 100 randomly chosen examples of positions of a white king, a white rook and a black king was used. Since the concept to be learned is that of illegality, the illegal positions were marked as positive examples and the legal positions as negative examples. There were 34 examples marked positive and 66 marked negative.

In the first iteration of the steps shown in FIG. 3, the learning system begins with the clause illegal(A,B,C,D,E,F): -body (illegal(A,B,C,D,E,F)), which simplifies to illegal(A,B,C,D,E,F): -true.

Since this clause covers some negative examples, the system then derives the set of designated refinements of it. The designated refinement with maximum gain is the result of the following linear nonlooping derivation:
rels(A,B,C,D,E,F)
rel(A,B,C,D,E,F),rels(A,B,C,D,E,F)
pred (C,E),rels(A,B,C,D,E,F)
C=E,rels(A,B,C,D,E,F),
which, after translation and simplification, corresponds to the Horn clause:

illegal(A,B,C,D,E,F):-C=E, which has an information gain of 21.405. This clause can be interpreted to mean that a position is illegal if the white rook and the black king are in the same rank. This is not quite true because the white king could be between the two; however, there were no examples of such a position in the sample. The chosen clause covers 14 positive examples and no negative examples, therefore it is added to the hypothesis and the positive examples covered are removed from the sample set.

The steps shown in FIG. 3 are then repeated a second time, again beginning with the clause illegal (A,B,C,D,E,F):-body(illegal(A,B,C,D,E,F)), and, after calculating the information gain for the same designated refinements as in the previous iteration, but using the reduced example set, choosing the clause illegal(A,B,C,D,E,F):-D=F, which has an information gain of 19.251. This clause covers ten positive examples; however, it also covers one negative example. Thus, as indicated by block 303, the steps shown in blocks 310, 311 and 312 are repeated to find the designated refinement of the latter clause with the highest information gain. The result is illegal (A,B,C,D,E,F):-D= $\wedge \neg$A= B, which excludes the one negative example covered by the previous clause. This clause states that a position is illegal if the white rook and the black king are on the same file and the white king is not on the main diagonal. This is not a correct refinement of the previous clause relative to the target concept, but there are no examples in the sample to contradict it. Thus, the clause is added to the hypothesis and the positive examples covered are deleted from the sample set.

The process is repeated twice more, resulting in the clause illegal (A,B,C,D,E,F):-adj(B,F $\wedge$(A,E), which covers another eight positive examples and corresponds to the two kings being next to each other or on the same square, and finally the clause illegal(A,B,C,D,E,F):-B= $\wedge$A =C, which covers the last two positive examples and corresponds to the white king and the rook being on the same square. Both these clauses required two iterations of the steps shown in blocks 310, 311 and 312 since there are two conjuncts in each clause.

Since there are no more positive examples that are not covered by the clauses, the hypothesis is complete with the four clauses generated as described above. These clauses are not an exactly correct definition of the illegal predicate. The first is too general, the second is only approximately correct and several cases are missing. However, on the whole the hypothesis is quite accurate; testing it on 5000 test examples gives an error rate of only 1.68%.

In practical applications of the learning system of the invention, it may not always be possible or practical for the learning system to generate clauses that do not cover at least some negative training examples. Thus, it may be necessary to incorporate a test that will deem a clause covering negative examples acceptable if the number of negative examples does not exceed a certain threshold. Such threshold can be, for example, a fixed percentage of the total number of training examples. Similarly, it may not always be possible to generate clauses that cover all positive training examples, and such a threshold test can also be used to determine when to stop generating additional clauses.

A bias introduced by background knowledge can be classified as "active" or "passive." Background knowledge that actually restricts the hypothesis space, rather than simply removing redundancy, is called an active bias. Background knowledge that only removes redundancy is called a passive bias. In the chess example described above, the bias introduced by the antecedent description language was a relatively weak passive bias.

In the chess example, there are terminal predicates that are vacuous because they are either always true or always false; for example, less-than(X,X) is always false and X=X is always true. Avoiding such vacuous predicates is an example of a passive bias. Similarly, since X= Y is logically equivalent to Y=X, only one of these predicates need be tested.

In the chess example, this sort of information can be encoded as background information in two steps. In the first step, the rule rel(A,B,C,D,E,F)pred(X,Y)

where member(X,[A,B,C,D,E,F]),member(Y,[A,B,C,D,E,F]) is replaced by the rule rel(A,B,C,D,E,F)pred(X,Y)

where subset([X,Y],[A,B,C,D,E,F]).

The subset (S,T) predicate in the new rule is implemented to be true if and only if each element in S also appears in T and the relative order of elements in S is the same as in T. These rules insure that the variables X and Y will be distinct and in canonical order in every pred(X, Y) generated using the grammar.

In the second step, the rules for pred(X, Y) are rewritten as follows:

pred(X,Y)->[X=Y]
pred(X,Y)->[¬X=Y]
pred(X,Y)->[ adj(X,Y)]
pred(X,Y)->[¬adj(X,Y)]
pred(X,Y)->[less_than(X,Y) ]
pred(X,Y)->[¬less_than(X,Y)]
pred(X,Y)->[less_than(Y,X) ]
pred(X,Y)->[¬less_than(Y,X)]

Notice that for the symmetric predicates equal and adj, only one order of the arguments X and Y is allowed, whereas for the nonsymmetric predicate less_than, either order is allowed. The modified grammar now generates no feature predicates in which the arguments are the same and generates only one possible ordering of the arguments to the adj and equal predicates.

Another way to introduce bias is to constrain how terminal predicates can be conjoined together in clauses. In the chess example, many combinations of predicates are either vacuous or can be simplified to a single predicate. For example, $$X=Y \wedge less\_than(X,Y)$$

is always false and $$\neg less\_than(X,Y) \wedge \neg less\_than(Y,X) \_ X \uparrow Y$$

The feature predicates for the chess example can only be related in the following ways:
  by one of the ordering conditions less_than, equal or ¬less_than,
  by one of the adjacency conditions adj or ¬adj, or
  with a conjunction of an ordering condition and an adjacency condition.
Any other conjunction is either vacuous or can be simplified to one of the three types of relationships described above.

Another form of background information relates differences in variable types. In the chess example, the arguments of the predicate illegal(A,B, C,D,E,F) are of two types: ranks and files. A natural constraint to impose is to require that the predicates equal, less_than and adj are used only between compatible types; that is, ranks will only be compared with ranks and files with files. However, a result of this constraint is that a clause such as illegal(A,B,C,D,E,F) :-C=D, which represents the condition that the rook is on the main diagonal of the chessboard, cannot be generated by the learning system.

FIG. 4 shows a revised antecedent description grammar for the chess example that incorporates the constraints discussed above. In rule 401, the three conjuncts 402 express the permitted relationships between rank variables and the three conjuncts 403 express the permitted relationships between file variables. Rule 404 states that a relationship between two variables can only consist of an ordering condition and an adjacency condition. Rules 405 are the permitted ordering predicates; rules 406 are the permitted adjacency predicates.

Using the antecedent description grammar of FIG. 4, a set of 100 examples of training data and the method shown in FIG. 3, the learning system of the invention generated the following Horn clauses:

illegal(A,B,C,D,E,F):-C=E
illegal(A,B,C,D,E,F): ¬B=D ,D= F
illegal(A,B,C,D,E,F):-adj(A,E),adj(B,F)
illegal (A,b,C,D,E,F): ¬less_than (C,A),B= D Another type of background knowledge that may be useful to a learning system is knowledge of common programming constructs, or "programming cliches" in the concept description language. For example, one programming cliche in Prolog is the class of conjunctions of the form $$p(X_1, \ldots, X_i, \ldots, X_k \wedge comparator(X_i, n)$$

where $X_i$ is a new, previously unbound variable, n is a constant and comparator is a numeric comparison operator like greater-than or less than. This kind of programming cliche can be called a "threshold comparator cliche."

The threshold comparator cliche allows the learning system of the invention to learn a class of concepts requiring threshold tests. An example is the classic problem of learning to distinguish among three kinds of irises on the basis of four attributes: sepal length, sepal width, petal length and petal width. An antecedent description grammar for this problem is shown in FIG. 5. Such grammar permits the generation of Horn clauses that comprise strings of threshold tests on such attributes. The possible threshold values listed in the grammar rules are all of the numeric values for the relevant attribute contained in a set of training data having 150 examples. For example, rule 601 permits a conjunct in a Horn clause to be a threshold test with the value of the threshold taken from the list of values [20 . . . ,44]. Using a set of training data with 106 randomly selected out of the 150 examples, the learning system of the invention generated a hypothesis for each kind of iris in turn. During the generation of a hypothesis, the training data examples for the kind being considered were treated as positive examples and the examples for the other two kinds were treated as negative examples. The hypotheses generated for the three kinds of iris were as follows:

Setosa:

setosa(A):-petal_width(A,B),B≦19

Versicolor:

versicolor(A):-(petal_width(A,B),B≧30),petal_width(A,C),C≦47 versicolor(A):-(sepal_width(A,B),B≦59), (petal_length(A,C), C≦16),petal_width(A,D),D≦49 versicolor(A):-(sepal_width(A,B),B≧59), (sepal_width(A,C), C≦60),sepal_length(A,D),D≧31 versicolor(A):-(sepal_length(A,B),B≦27), (petal_length(A,C), C≦16),sepal_length(A,D),D≧27

Virginica:

virginica(A):-(petal_width(A,B),B≧48(petal_length(A,C),C≧19 virginica(A):-(petal-width(A,B),B≧48), (petal_length(A,C), C≧18),sepal_width(A,D),D≧60 virginica(A):-(petal_width(A,B),B≧50),sepal_width(A,C),C≧61 virginica(A):-(petal-width(A,B),B≧50),sepal_width(A,C),C≦59 virginica(A):-(petal-width(A,B),B≧50),sepal_length(A,C),C≦22

The 44 examples of the training set that were not used to generate the hypotheses were then used to test their accuracy. The hypothesis for Setosa made no errors in classifying the 44 examples, but the hypotheses for Versicolor and Virginica each made 3 errors.

It is often the case that background knowledge can be expressed in the form of an initial theory that approximates the target theory; that is, a set of Horn clauses might be known that is similar to the target theory in some well understood way. For example, the approximate theory might be overgeneral, containing more clauses than the ideal target theory; incomplete, containing fewer clauses that the ideal target theory; or syntactically approximate, in that it contains several types of defects relative to the ideal target theory. It is often possible to construct from such an approximate theory an antecedent description grammar that will generate only clauses similar to some clause consistent with the approximate theory. Clauses generated by such an antecedent description grammar are often more accurate than arbitrary clauses, and hence can be used to form a more accurate hypothesis.

The learning system of the invention has been applied to a number of practical problems. For example, using an antecedent description grammar constructed from an approximate theory for recognizing DNA promoter sequences, the learning system of the invention produced a hypothesis giving only 12.5% error as compared to 28.0% error using standard decision-tree learning techniques on the same training data. In another example, using an antecedent description grammar constructed from an approximate theory for pronouncing the dipthong "ui," given a context of five letters to the left and right of the dipthong, the learning system of the invention produced a hypothesis giving only 16.9% error as compared to 23.4% error using standard decision-tree techniques.

The learning system of the invention can be implemented in a digital computer on which a Prolog interpreter is resident. Such digital computer is programmed to accept input for a learning problem in the form of an antecedent description grammar and training data and to carry out the method of FIG. 3. Creation of such a program would be well within the capability of one skilled in the art. It will also be clear to those skilled in the art that concept description languages other than Prolog could be used to carry out the method of the invention.

As can be seen from the above description, the learning system of the invention can be used advantageously to take into account various kinds of background knowledge about a target concept to be learned.

What is claimed is:

1. A method of using a computer to form a hypothesis for a target concept from (i) known relations and (ii) training data containing both positive and negative examples, said hypothesis including one or more logic clauses, which comprises the steps of:

creating an antecedent description grammar containing a plurality of rules defining permissible ways to generate said logic clauses from said known relations;

loading said training data and said grammar into said computer;

in said computer:

generating a logic clause for said hypothesis in accordance with said grammar, said logic clause being true for at least one of said positive examples but false for substantially all of said negative examples;

removing from said training data the positive examples for which said logic clause is true;

adding said logic clause to said hypothesis; and repeating said generating, removing and adding steps until substantially all said positive examples are removed;

wherein said generating step comprises the steps of:

formulating an initial logic clause in accordance with said grammar;

if said initial logic clause is true for negative examples, refining said initial logic clause; and if said refined clause is true for negative examples, repeating said refining step until said clause is no longer true for substantially all said negative examples;

and wherein said refining step comprises the steps of:

deriving a plurality of refinements of the clause being refined, each refinement being derived by applying the rules of said grammar in a nonlooping linear sequence;

calculating an information gain for each said refinement with respect to the clause being refined; and choosing the refinement with the highest information gain.

2. The method of claim 1 in which the information gain of the refined logic clause $C_{i+1}$ with respect to the initial logic clause or refined logic clause being refined $C_i$ is defined as $$\text{Gain}(C_{i+1}, C_i) \equiv T_i^{++} \times \left( -\log_2 \frac{T_i^+}{T_i^+ + T_i^-} + \log_2 \frac{T_{i+1}^+}{T_{i+1}^+ + T_{i+1}^-} \right)$$

where i is an integer greater than 0, $T_i^+$ and $T_i^-$ are the number of positive and negative examples respectively covered by $C_i$ and $T_i^{++}$ is the number of positive examples covered by $C_i$ that are also covered by $C_{i+1}$.

3. In a method of using a computer to form a hypothesis for a target concept from (i) known relations and (ii) training data containing both positive and negative examples, said hypothesis including one or more logic clauses, which method includes the steps of:

loading said known relations and said training data into said computer;

in said computer:

generating a logic clause for said hypothesis from said known relations, said logic clause being true for at least one of said positive examples but false for substantially all of said negative examples;

removing from said training data the positive examples for which said logic clause is true;

adding said logic clause to said hypothesis; and repeating said generating, removing and adding steps until substantially all said positive examples are removed;

wherein said generating step includes the steps of:

generating an initial logic clause;

if said initial logic clause is true for negative examples, refining said initial logic clause; and if said refined clause is true for negative examples, repeating said refining step until said clause is no longer true for substantially all said negative examples;

and wherein said refining step comprises the steps of:

deriving a plurality of refinements of the clause being refined, calculating an information gain for each said refinement with respect to the clause being refined; and choosing the refinement with the highest information gain; the improvement comprising:

creating an antecedent description grammar containing a plurality of rules defining permissible ways to generate said logic clauses from said known relations;

loading said grammar into said computer;

in each said generating step, generating said logic clauses in accordance with said grammar; and in each said refining step; deriving each refinement by applying the rules of said grammar in a nonlooping linear sequence.

4. The method of claim 1 wherein said antecedent description grammar is based on one or more of the following types of background knowledge about said target concept: background knowledge for avoiding vacuous predicates in said logic clauses, background knowledge about differences in types of variables, background knowledge in the form of useful programming constructs relevant to said target concept and background knowledge in the form of logic clauses that approximate said target concept.

* * * * *